UNITED STATES PATENT OFFICE.

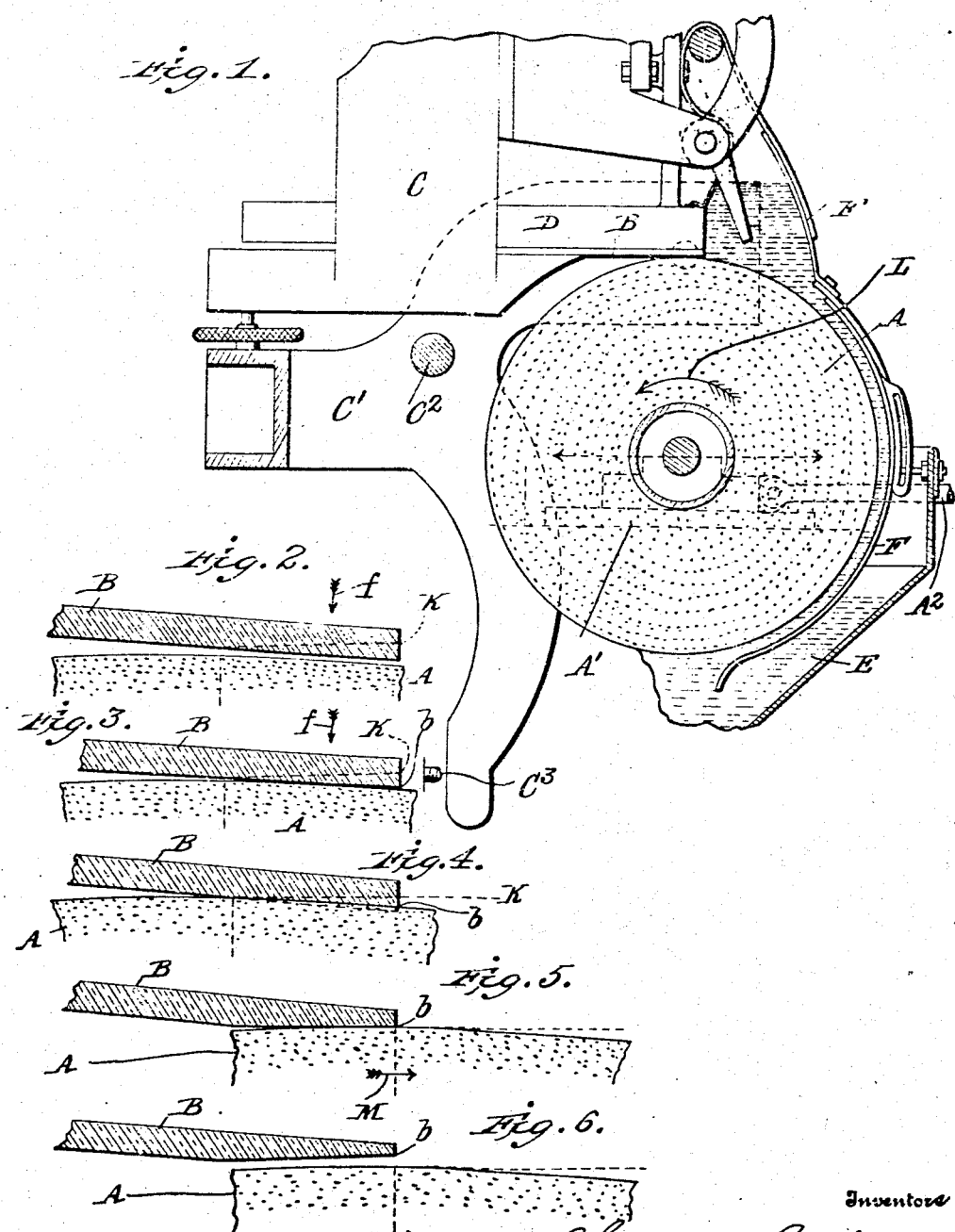

CHARLES L. GOEHRING AND WILLIAM TROCHE, OF AKRON, OHIO; SAID TROCHE ASSIGNOR TO SAID GOEHRING.

ART OF BEVELING GLASS.

No. 917,937.         Specification of Letters Patent.         Patented April 13, 1909.

Application filed July 19, 1906. Serial No. 326,864.

*To all whom it may concern:*

Be it known that we, CHARLES L. GOEHRING and WILLIAM TROCHE, citizens of the United States, residing in Akron, in the county of Summit and State of Ohio, have invented certain new and useful Improvements in the Art of Beveling Glass; and we do hereby declare the following to be a full, clear, and exact description of the same, reference being had to the accompanying drawings, forming a part of this specification, and to the letters of reference marked thereon.

In glass grinding and particularly in grinding bevels on glass plates it has heretofore been found exceedingly difficult to grind away the surplus glass and at the same operation and with the same grinder produce a surface and edges to the bevel ready for the step known in the art as white wheeling. The difficulties are due to the danger of breakage to the formation of irregularities, deep scratches or scoring of the ground surface and to the "sand blasting" of the edges of the bevel under ordinary manipulations.

The object of the present invention is to overcome these difficulties and to enable the glass to be ground or beveled with a true flat or plane surface up to the white wheel or polishing stage by a single manipulation and with one grinder or stone.

The invention consists primarily in presenting the flat face of the glass to the convex face of the grinder, moving the glass and grinder toward each other until the edge of the glass establishes a grinding contact with the stone and the heel or inner edge of the bevel is formed, then immediately moving the glass and grinder with respect to each other in a plane parallel with the plane of the bevel and while maintaining the edge of the glass seated against the grinder, to form the flat face and outer edge of the bevel.

The invention further consists in feeding water to the grinding point by the rotation of the grinder and confining the body of water being fed from a point within the tank beneath the grinder to a point in proximity to the grinding point whereby the volume of water fed to the grinding point is augmented sufficiently to maintain the edge of the glass immersed.

In the accompanying drawings—Figure 1 is a sectional elevation of a portion of a machine with which the present invention may be practiced. Figs. 2, 3, 4, 5 and 6 are detail diagrammatic sections illustrating the several movements of the glass and grinder with relation to each other in accordance with the present invention.

Like letters of reference in the several figures indicate the same parts.

The grinder is indicated by the letter A and the glass by the letter B. As illustrated in Fig. 1 the glass is held in a carriage C and suitably clamped by a clamp D for presentation to the grinder, but inasmuch as the mechanism for moving the same forms no part of the present invention, it is not illustrated. Conveniently, the carriage C may be mounted on a frame C' pivotally mounted on a center at C² around which it swings in moving the glass toward and away from the grinder. The movement of the frame is limited by an adjustable stop C³. The grinder is bodily movable on a horizontal way A', and bodily movement is imparted to it through connecting rod A².

The grinder A is an ordinary cylindrical grinder rotated toward the glass as indicated by the arrows L and sufficiently coarse to grind away the glass rapidly and it runs with its lower portion in a body of water held in a tank E. Extending from a point below the water level in the tank around and in proximity to the upwardly moving side of the grinder, is a guard F forming a shallow channel in which water is carried up by the grinder to the grinding point. The effect of confining the water by the guard is to enable the grinder to elevate a relatively large volume of water and the guard is extended above the level of the grinding point to form an elevated chamber in which a body of water is confined to keep the leading edge of the glass completely immersed, this being found necessary to prevent breakage of the glass being operated on. Obviously the water may be confined on the upper side of the grinder by any desired means.

In presenting the glass to the grinder in accordance with this invention the parts initially occupy the positions shown in Fig. 2 and are moved directly toward each other as by moving the glass down as shown by the arrows *f*, (Figs. 2 and 3) the point of initial contact being sufficiently far in advance of the heel as inner edge of the bevel to permit the front edge of the glass to seat against or form a grinding contact with the grinder before the inner edge or heel of the bevel is formed. At the instant when the grinder has entered the glass to the required depth to form the heel or inner edge of the bevel their movement toward each other is arrested and the glass and grinder are given a traverse or feed movement with relation to each other in a plane parallel to the plane of the bevel being formed as indicated by the arrows M (Figs. 4 and 5) and in direction to carry the grinder toward the front or outer edge of the bevel. During the whole of this movement parallel with the plane of the bevel the edge of the glass is kept in grinding contact with the grinder to form an abutment for preventing the entry of free grit between the grinder and glass. When the surplus glass is removed (Fig. 5) to the plane of the bevel indicated in Figs. 2, 3 and 4 by the dotted line K the glass and grinder are at once separated as shown in Fig. 6. During the whole of the grinding operation a body of water is maintained on the upper side of the grinder sufficient to keep the grinding point immersed.

It is important that the feed movement shall commence instantly upon the cessation of the movement of the glass and grinder toward each other and that the feed movement and speed of rotation of the grinder shall be uniform during the cutting of a bevel in order to avoid the formation of waves or irregularities in the bevel. Stoppage or variation in the feed movement or variation in speed of rotation of the grinder it is found cuts the glass more or less at the point being operated on and even though it be slight the imperfection is apparent owing to the difference in light reflection and refraction.

The bringing of the edge of the glass into grinding contact with the grinder and maintaining the said contact throughout the whole of the grinding operation is of the highest importance inasmuch as it is found that by this procedure alone it is possible to prevent the formation of scratches and sand blasted edges and at the same time maintain the grinding point immersed in a sufficient body of water to prevent breakage of the glass.

Having thus described our invention, what we claim as new and desire to secure by Letters Patent, is:—

1. The improvement in the art of grinding bevels on glass plates, which consists in establishing and maintaining a grinding contact between the edge of the glass and grinder and while maintaining such contact, first forming the inner edge or heel of the bevel and then the plane face and outer edge of the bevel.

2. The improvement in the art of grinding flat bevels on glass plates, which consists in establishing and maintaining a grinding contact between the entire edge of the glass and the convex face of a grinder during the entire formation of the bevel by the grinder and moving the grinder and glass with respect to each other parallel to the plane of the bevel.

3. The improvement in the art of flat beveling glass plates, which consists in rotating the grinder toward the glass, establishing a grinding contact between the edge of the glass and grinder and while maintaining such contact, forming first the inner edge or heel of the bevel and then the plane surface and outer edge of the bevel by a traverse of the grinder and glass with relation to each other parallel with the plane of the bevel.

4. The improvement in the process of beveling glass, which consists in rotating the grinder toward the glass and thereby elevating water to the upper side of the grinder, confining said water in a body on the upper side of the grinder, and presenting the glass to the grinder with its edge immersed in said body of water.

5. The improvement in the process of beveling glass, which consists in rotating the grinder toward the glass and thereby elevating water to the upper side of the grinder, confining said water in a body on the upper side of the grinder, presenting the glass to the grinder with its edge immersed in said body of water and maintaining a grinding contact between said edge and the grinder during the formation of the bevel.

CHARLES L. GOEHRING.
WILLIAM TROCHE.

Witnesses:
H. M. HOLLINGER,
MARY MARTIN.